United States Patent [19]

McWhorter

[11] 4,089,235
[45] May 16, 1978

[54] INTRA-ARTICULATE CONNECTING ROD FOR SMALL ENGINES

[76] Inventor: Edward Milton McWhorter, 6931 Greenbrook Cir., Citrus Heights, Calif. 95610

[21] Appl. No.: 693,887

[22] Filed: Jun. 7, 1976

[51] Int. Cl.$^2$ ............................................. G05G 1/00
[52] U.S. Cl. ................................... 74/579 E; 74/581; 123/197 AB; 123/197 AC
[58] Field of Search ............... 74/579 E, 581, 579 R; 123/78 E, 197 R, 197 A, 197 AB, 197 AC

[56] References Cited

U.S. PATENT DOCUMENTS

| | | | |
|---|---|---|---|
| 1,379,115 | 5/1921 | Mallory | 123/197 A |
| 1,797,493 | 3/1931 | Baxter | 74/579 E |
| 1,988,571 | 1/1935 | Rider | 74/581 |
| 3,859,976 | 1/1975 | McWhorter | 74/581 |
| 3,908,623 | 9/1975 | McWhorter | 123/197 A |

Primary Examiner—C. J. Husar

[57] ABSTRACT

The invention is a connecting rod for use in reciprocating piston driven internal or external combustion engines. The connecting rod design presented consists of two component parts pivotally joined near the center and in this respect differs from the single piece rigid link connecting rods generally described as comprising the four-bar linkage slider mechanism of other engine systems.

1 Claim, 8 Drawing Figures

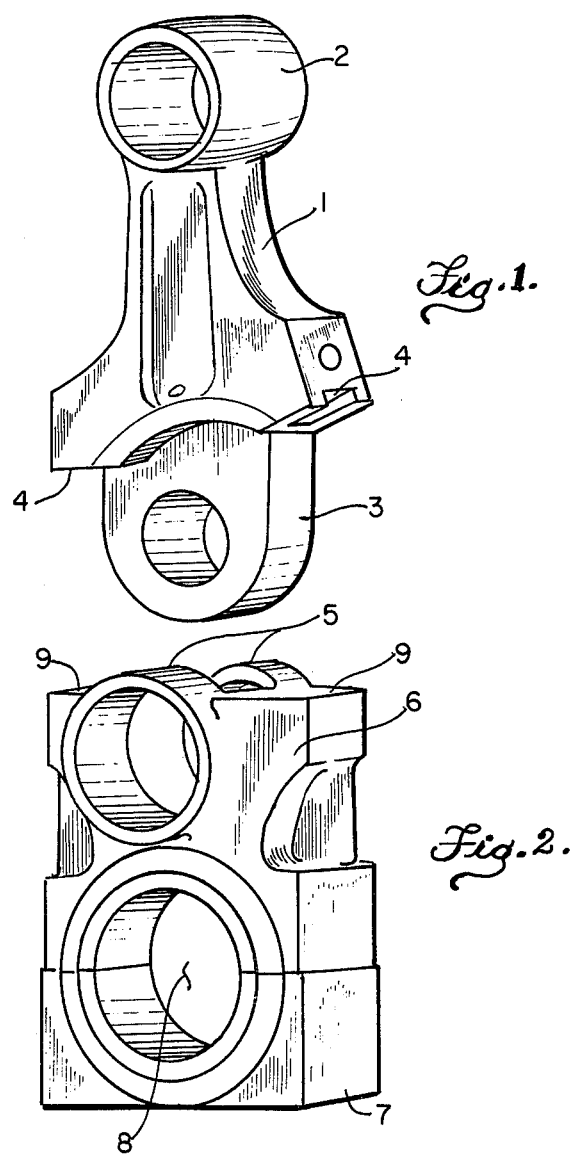

INTRA-ARTICULATE CONNECTING ROD FOR SMALL ENGINES

BACKGROUND OF THE INVENTION

1. Field of the Invention

The invention relates to a limited extent to the field of variable clearance engines. However, because of additional novelty of the design and because of the additional complexity of the mechanism and its effect on piston motion, the invention may be classified more accurately as belonging to the field of advanced reciprocating engine systems. This latter classification refers to any engine system in which movement of the piston is not entirely dependent on the simple harmonic motion induced by rotation of the crankpin.

2. Description of Prior Art

In the conventional reciprocating engine system the connecting rod is a simple rigid link comprising an element of the four-bar linkage slider mechanism. The invention presented incorporates a pivot or hinging joint at some point near the center of the connecting rod and therefore the linkage network of this system becomes a five-bar mechanism. This introduces a certain amount of random movement in the linkage which must be controlled within definite limits if the mechanism is to be useful. In order to accomplish this the pivoting action is restricted in a manner such that the connecting rod longitudinal axis is straight in one position and hinged approximately 30° in another position. These positions are referred to respectively in other parts of the specification as the uncocked and cocked positions. At intermediate transition points between these two positions the piston is free floating. Actuation from one to the other depends on the careful balance of total gas pressure forces operative at the piston face and transmitted along the connecting rod longitudinal axis, and the reactant resultant vector components of tangential and inertial forces centered at the crankpin and acting along the connecting rod longitudinal axis respectively. The linkage is therefore controlled in a manner such that during the compression stroke the rod is pivoted at the cocked angle of approximately 30° while at the end of the exhaust stroke the connecting rod is in the fully extended straight or uncocked positon. Because piston travel is greater in the uncocked position the piston displaces more of the combustion gases in the clearance volume during the exhaust stroke. This decreases the amount of residual combustion gas in the clearance volume and therefore the subsequent inducted fresh fuel/air charge is not heated to the same extent thus improving the engine volumetric efficiency. Ignition is also improved since vitiation of the fresh charge is not as great which promotes the initial flame propagation at the lower dilution level.

There is another advantage to the system which is of a more subtle nature. During the initial expansion stroke the connecting rod is hinged in the 30° cocked position. However, as the piston drops the angularity between the piston wrist pin and crankpin changes and gas pressure on the piston face is lower and the resultant vector dynamic forces cause the connecting rod to snap into the straightened or uncocked positon. The general effect on the engine is to cause the cylinder pressure to increase slightly during this period and thus obtain more power from the expansion stroke.

SUMMARY OF THE INVENTION

It is the primary object of this invention to provide in a manner hereinafter set forth a means of more efficiently purging combustion gases from the clearance volume of reciprocating piston driven engines by causing the piston to move into the clearance volume during the exhaust stroke.

Another very important object of the invention is to momentarily increase the engine cylinder pressure during the expansion stroke by causing the connecting rod length to increase such that the piston rises slightly thus increasing the power of the engine.

All of the foregoing and still further objects and advantages of the invention will become apparent from the study of the drawings and specification presented.

BRIEF DESCRIPTION OF THE DRAWINGS

There are presented as part of the specification, drawings of the connecting rod and symbolic illustrations of its manner of operation.

FIG. 1 is a perspective view of the upper portion of the connecting rod.

FIG. 2 is a perspective view of the lower portion of the connecting rod.

DESCRIPTION OF THE PREFERRED EMBODIMENTS

Figure 3:
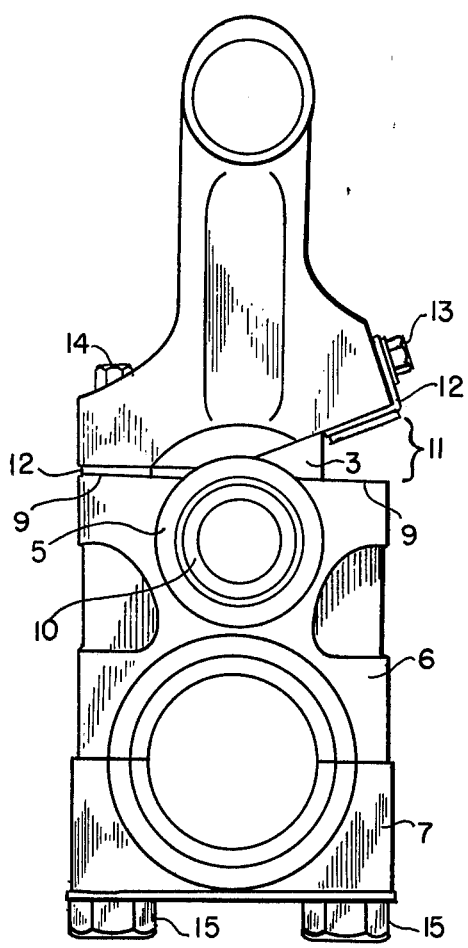
FIG. 3 is an assembly drawing of the connecting rod.

Referring now to the drawings in detail and to FIG. 1 thereof in particular. FIG. 1 is a casting or forging of the upper portion of the connecting rod, comprising an upper connecting rod arm 1, a piston wrist pin boss 2, connecting rod knuckle pin boss 3, and impactor slots 4 which are located on the shoulder arm 1 on both sides of knuckle pin boss 3.

Turning now to FIG. 2 showing the lower portion of the connecting rod which is a casting or forging comprising knuckle pin journal bearing bosses 5, lower connecting rod 6, lower connecting rod cap 7, crankpin journal 8, and impactor anvils 9 which are flat surfaces on the shoulders of lower connecting rod 6.

Turning now to FIG. 3 which shows the assembly of the upper and lower portions of the connecting rod previously shown in FIGS. 1 and 2 respectively. The two pieces are pivotally joined by knuckle pin 10 which extends transversly passing through knuckle pin journal bosses 5 and knuckle pin boss 3. The upper portion of the connecting rod is therefore seen to be free to pivot in the lower portion within the extent and range designated by the character 11.

Impactors 12 which are small pieces of resilient material with a sheet metal backing are held in impactor slots 4 by bolts 13 and 14. The impactors 12 strike against anvils 9 of the lower connecting rod 6 during the transition from the cocked position to the uncocked position and vice versa. Bolts 15 secure lower connecting rod cap 7 to the lower connecting rod 6.

Figure 4:
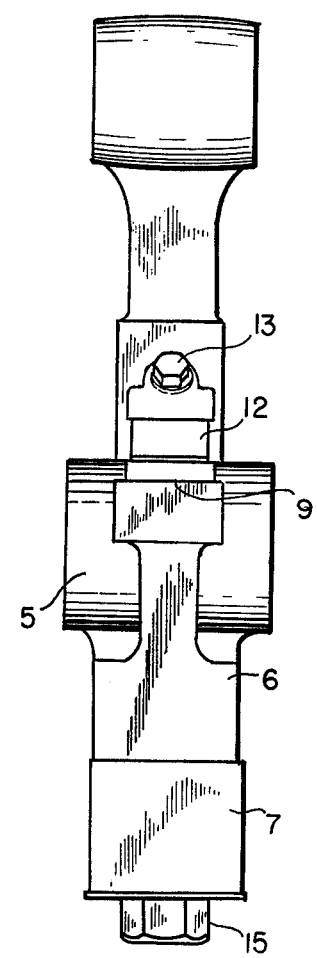
FIG. 4 is a side view of assembly shown in FIG. 3.

FIG. 4 is a side view of FIG. 3 showing the side profile and is presented only for clarity.

From the foregoing discussion it can be seen that the invention consists of a connecting rod constructed of two principal parts and having the capability of operating in a cocked position of about 30° or in a straight or uncocked position. The effect of this innovative feature on engine performance can best be understood by studying the symbolic representation of its operation shown in FIGS. 5 through 8.

Figure 5:
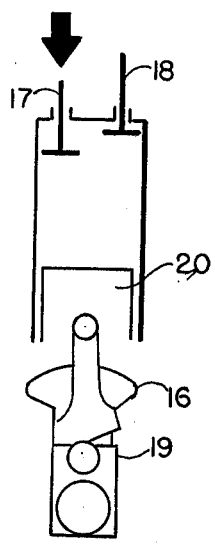
FIG. 5 is a symbolic illustration showing the connecting rod in the straightened uncocked position with the engine piston at the crank bottom-neutral-center position during the induction stroke.

In FIG. 5 a piston 20 is shown at crank 16 bottom-neutral-center position at the end of the induction stroke with induction valve 17 open and exhaust valve 18 closed. The connecting rod, depicted as character 19, is in the straight uncocked position.

Figure 6:
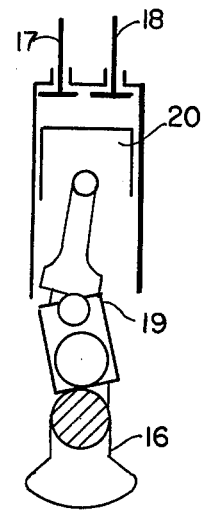
FIG. 6 is a symbolic illustration showing the connecting rod in the 30° cocked position with the engine piston at the crank top-neutral-center positon during the compression stroke.
Figure 7:
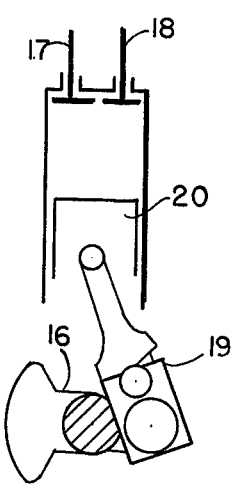
FIG. 7 is a symbolic illustration of the connecting rod showing the engine piston at approximately the 90° crank position during the expansion stroke.

In FIG. 6 the piston 20 is at crank 16 top-neutral-center position with induction valve 17 and exhaust valve 18 closed. The connecting rod 19 is in the cocked position. The cocked position is caused by the combined tangential force acting on the knuckle pin and the total pressure force acting on the piston face during compression stroke. Turning now to FIG.7. FIG. 7 shows the piston 20 in the crank 16 approximate 90° position during the expansion stroke with induction valve 17 and exhaust valve 18 closed. The connecting rod is seen to be in the straight uncocked poition. Actuation to the uncocked position from the cocked position in FIG. 6 occurs when the total pressure force acting on the piston 20 face is decreased allowing the tangential forces active at the knuckle pin to overcome the combined inertial and piston pressure forces as the rod angularity changes. These factors cause the rod to snap into the straight uncocked position thus increasing the length of linkage between the crankpin and piston wrist pin slightly and causing the piston motion to change in a corresponding manner. The general effect on the engine operation under full load is to increase the cylinder pressure slightly and thus increase its power. During the actuation the impactor provides a resilient striking surface for the upper connecting rod to impact with the anvil surfaces of the lower connecting rod and thus decrease the operating noise level of the engine. From the position shown in FIG. 7 the connecting rod 19 continues downward in the straight uncocked position to some point past the bottom-neutral-center position at the end of the expansion stroke.

Figure 8:
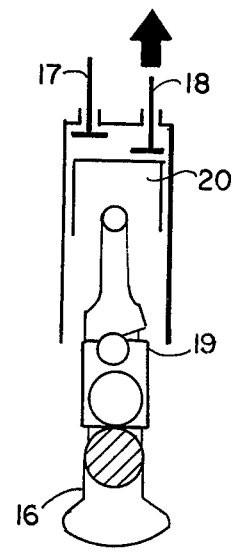
FIG. 8 is a symbolic illustration of the connecting rod showing the engine piston at the crank top-neutral-center position at the end of the exhaust stroke.

At the beginning of the exhaust stroke with induction valve 17 closed and exhaust valve 18 open the connecting rod once again assumes the cocked position. However, at the end of the exhaust stroke the piston floats free to the connecting rod uncocked position since there are not sufficient restraining pressure forces above the piston to keep it in the cocked position. This allows inertial forces to carry the piston into the clearance volume and thus more effectively purge the clearancea volume of combustion gases. The top-neutral-center position at the end of the exhaust stroke is shown in FIG. 8.

What is claimed is:

1. A connecting rod constructed in two principal parts comprising upper and lower portions, said upper portion having a boss for holding a piston wrist pin, an arm connecting said boss to a second knuckle pin boss, a resilient material fixedly attached to the said upper portion at two points which are located on each side of the said knuckle pin boss, said knuckle pin boss positioned between two knuckle pin journals fixedly attached to the said lower portion of said connecting rod, a knuckle pin passing through and extending transversely between said knuckle pin journals and also passing through said knuckle pin boss, thus pivotally connecting said upper portion and said lower portion of said connecting rod, said resilient material contacting shoulders on the said lower portion of said connecting rod on alternate pivot positions of said pivotally attached upper and lowr portions of said connecting rod, a large journal and journal cap on the said lower portion of said connecting rod for rotatively mounting on a crankpin.

* * * * *